(12) United States Patent
Vessereau et al.

(10) Patent No.: US 7,751,038 B2
(45) Date of Patent: Jul. 6, 2010

(54) APPARATUS AND METHOD FOR OBTAINING IMAGES OF A BOREHOLE

(75) Inventors: Patrick Vessereau, Hericy (FR); Philip Cheung, Montesson (FR); Daniel Codazzi, Gif sur Yvette (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 355 days.

(21) Appl. No.: 11/762,116

(22) Filed: Jun. 13, 2007

(65) Prior Publication Data

US 2007/0296810 A1 Dec. 27, 2007

(30) Foreign Application Priority Data

Jun. 15, 2006 (EP) .................................. 06291007

(51) Int. Cl.
*G01N 21/00* (2006.01)
(52) U.S. Cl. .................................. 356/241.1
(58) Field of Classification Search .... 356/240.1–240.2
See application file for complete search history.

(56) References Cited

U.S. PATENT DOCUMENTS

| 2,632,801 A | 3/1953 | Donaldson |
| 2,912,495 A | 11/1959 | Moon et al. |
| 3,960,448 A * | 6/1976 | Schmidt et al. ................ 356/32 |
| 3,974,330 A * | 8/1976 | Askowith et al. ............. 348/85 |
| 5,134,471 A | 7/1992 | Gendron et al. |
| 5,903,306 A * | 5/1999 | Heckendorn et al. .......... 348/85 |

FOREIGN PATENT DOCUMENTS

| DE | 1084666 | 7/1960 |
| DE | 9310106 | 9/1993 |
| EP | 0210826 | 2/1987 |
| EP | 0264511 | 4/1988 |
| EP | 0846840 | 6/1998 |
| WO | WO0206631 | 1/2002 |
| WO | WO2004003506 | 1/2004 |

* cited by examiner

*Primary Examiner*—Michael P Stafira
(74) *Attorney, Agent, or Firm*—Dave R. Hofman; Myron K. Stout

(57) ABSTRACT

Apparatus for obtaining images of the wall of a borehole, comprises a tool body; a light source mounted on the tool body and arranged to illuminate the borehole wall; a camera mounted in the tool body; and a mirror moveably mounted on the tool body and spaced axially from the camera and arranged to reflect an image of the borehole wall at the camera, wherein the movement of the mirror allows images of different parts of the borehole wall to be reflected at the camera.

17 Claims, 1 Drawing Sheet

APPARATUS AND METHOD FOR OBTAINING IMAGES OF A BOREHOLE

TECHNICAL FIELD

This invention relates to apparatus and methods for obtaining images of the wall of a borehole. It is particularly applicable to obtaining images in oil, water or gas wells, or the like.

BACKGROUND ART

There are a number of existing techniques by which images of the inside of a borehole are obtained. However, most of these rely on reconstructing an image on the basis of measurements made of other than optical properties. Measurements used for such imaging include electrical conductivity or permittivity, acoustic impedance or slowness, or density of photoelectric effect. It is also desirable to obtain optical images to better understand the formation and the state of the borehole.

Certain tools have been proposed for obtaining optical images in boreholes. Several have a camera pointed axially down the borehole and can image flowing fluids together with some neighbouring part of the borehole wall. Such tools are dependent on the well fluid being either substantially clear, or the well being shut in and the well fluid being replaced with a clear fluid such as water. An example of such a tool can be found in WO 0206631 A (DHV INTERNATIONAL INC) 24 Jan. 2002.

Proposals for providing images of the borehole wall with an axially aligned camera include the use of hemispherical or conical mirrors coaxial with the camera, see for example EP 0264511 A (SOCIETE DE PROSPECTION ELECTRIQUE SCHLUMBERGER) 27 Apr. 1988, EP 0846840 A (SCHLUMBERGER LTD ET AL) 10 Jun. 1998 or U.S. Pat. No. 2,912,495 (JAMES MOON ET AL) 10 Nov. 1959. The use of fish-eye lenses is also proposed to improve the radial coverage of the image.

An alternative to this can be found in U.S. Pat. No. 5,134,471 (NORANDA INC) 28 Jul. 1992 which describes the use of a radially directed camera which is rotated around the tool axis to provide full coverage of the borehole wall.

The use of hemispherical or conical images or fish-eye lenses suffers from the problems of distortion of images leading to the need to have complex compensating camera optics to obtain a useful image. Furthermore, the limited space available in most boreholes means that it is often not possible to mount the camera radially. Also, the mechanism to rotate the whole camera can be complex.

It is one object of the invention to provide a tool using a camera to obtain images of a borehole wall that does not suffer from the image distortion problems or complexity of the prior art.

SUMMARY OF THE INVENTION

One aspect of the invention comprises apparatus for obtaining images of the wall of a borehole, comprising:
 a tool body;
 a light source mounted on the tool body and arranged to illuminate the borehole wall;
 a camera mounted in the tool body; and
 a mirror moveably mounted on the tool body and spaced axially from the camera and arranged to reflect an image of the borehole wall at the camera, wherein movement of the mirror allows images of different parts of the borehole wall to be reflected at the camera.

By arranging for movement of the mirror, a flat mirror can be used, reducing the amount of distortion of the image and making processing and interpretation easier.

Preferably the mirror is mounted for at least one of axial movement along the tool body, rotation around the tool axis, and adjustment of the angle of the mirror to the tool axis.

The mirror and light source can be mounted in a transparent sleeve.

Well fluids such as drilling muds are often opaque, making optical imaging difficult. However, shutting in a whole well and replacing the well fluid with a clear fluid is expensive, time consuming and may result in loss of well control.

It is therefore particularly preferred that means are provided for isolating an interval of the borehole in which images are to be obtained from the remainder of the borehole. The means can comprise a pair of packers spaced apart on the tool body.

The apparatus can further comprise means for filling the interval with a clear fluid. The means can comprise a pump system arranged to removing fluid from the interval and introduce the clear fluid and can further comprise a reservoir of clear fluid in the tool body.

The camera can be mounted near one end of the interval and the light source mounted near the other end of the interval.

A further embodiment of the invention includes one or more jets arranged to direct fluid flow at the borehole wall to clean deposits therefrom.

A second aspect of the invention comprises a method of obtaining images of a boreole wall, comprising:
 positioning an imaging apparatus in the borehole, the imaging apparatus comprising a light source, a camera and a moveable mirror spaced from the camera;
 illuminating the borehole wall with the light source; and
 moving the mirror so as to reflect images of different parts of the borehole wall at the camera.

Preferably, the mirror is moved so as to change one or more of its axial position on the tool body, rotational position about the tool axis or angle to the tool axis.

The method can further comprise isolating an interval of the borehole in which images are to be obtained from the remainder of the borehole.

The isolated interval can be filled with a clear fluid, for example by removing well fluid from the interval and replacing it with the clear fluid.

It is also preferable to remove deposits from the borehole wall by directing jets of fluid against the wall.

DETAILED DESCRIPTION

Figure 1:
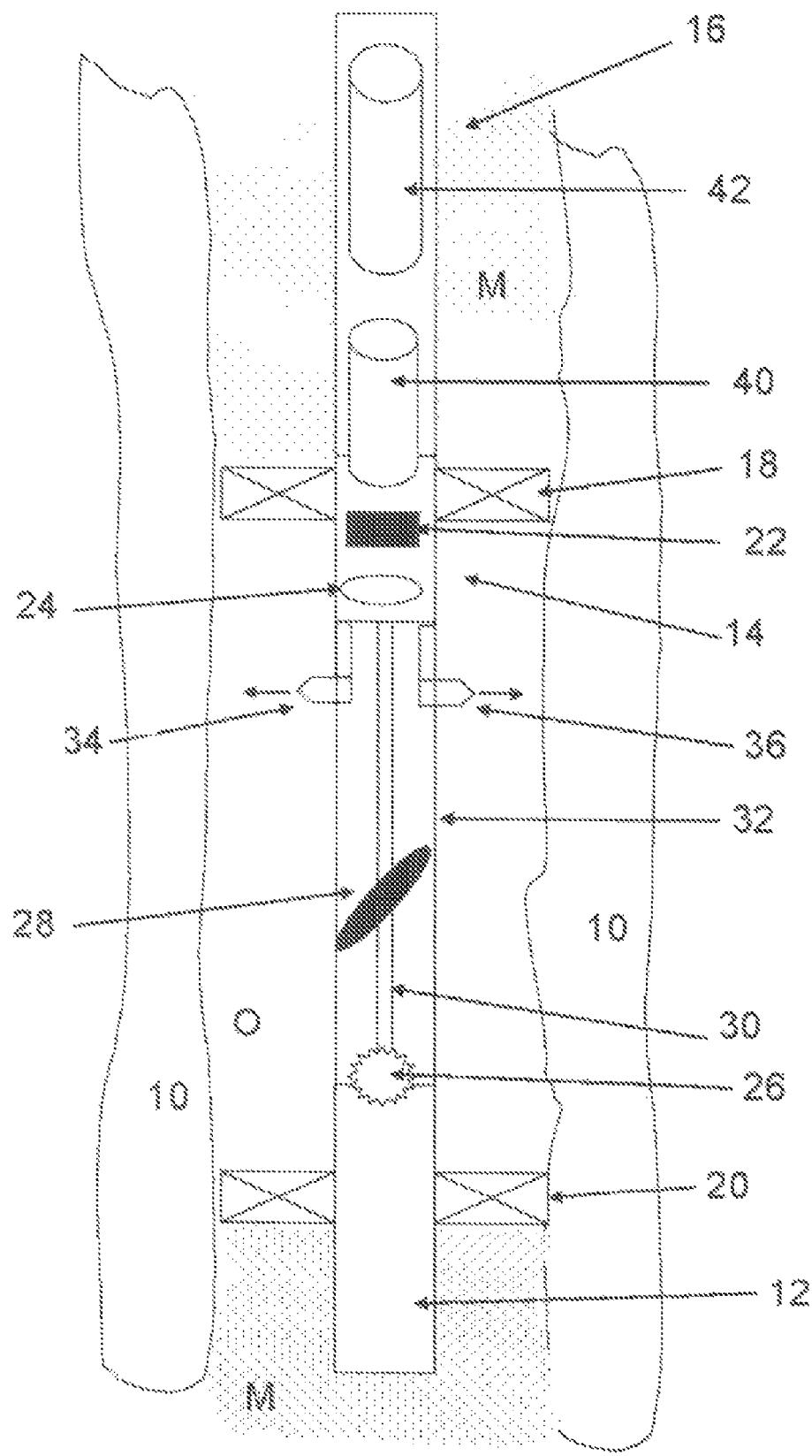
FIG. 1 shows an apparatus according to an embodiment of the invention.

The apparatus shown in FIG. 1 comprises a wireline tool according to one embodiment of the invention for obtaining images in wells such as oil, water and gas wells drilled through underground formations 10. The tool comprises a tool body 12 that is suspended in the well by means of a wireline cable or coiled tubing (not shown). The tool body includes an imaging section 14 and a pumpout section 16.

The imaging section 16 comprises a pair of spaced inflatable packers 18, 20. A CCD camera 22 and lens 24 are located in an upper part of the imaging section near the packer 18. The camera 22 is maintained in a pressure-tight cartridge at atmospheric pressure and its temperature controlled by a suitable control system and/or insulation, and is aligned on the axis of the tool body 12 directed downwardly towards the opposite end of the tool body, at which a light source 26 is located near the packer 20. The lens 24 includes a focusing and zoom mechanism. Interposed between the light source 26 and lens 24 is an articulated mirror 28 mounted on a transport system 30. The mirror 28 is mounted on the tool axis. Typically a flat mirror can be used. The transport system 30 includes a motor driven worm screw for moving the mirror 28 axially between the lens 24 and light source 26. The transport system 30 also includes actuators for rotating the mirror 28 about the tool axis and adjusting the angle of the mirror relative to the tool axis.

The light source 26, mirror 28 and transport system 30 are enclosed in a transparent sleeve 32. The interior of the sleeve 32 is pressure balanced to match the pressure of the fluid in the borehole in the conventional manner.

High pressure fluid jets 34, 36 are mounted on the outside of the imaging section 14 near the upper packer 18. These jets 34, 36 are arranged to direct fluid radially outwardly so that when the tool is placed in the borehole 10, the flow from the jets can be used to remove deposits from the wall, such as drilling mud, to leave a clear view of the wall.

The pumpout section 16 comprises a pump 40 and a reservoir 42 of clear fluid (oil). The pump is connected to the packers 18, 20 and has inlets and outlets between the packers and above and/or below them. The pump 40 is also connected to the reservoir 42.

In use, the tool body 12 is lowered into the borehole to the region to be imaged. At this point, the upper and lower packers 18, 20 are inflated using the pump 40 to seal against the borehole wall and define an isolated interval between them. Fluid is pumped from the jets 34, 36 to clean mud deposits and the like from the borehole wall and leave open formation.

Once the interval is isolated, the pump is operated to remove the well fluids/drilling mud (opaque) M and replace them with oil (clear) O from the reservoir 42, maintaining pressure balance in the interval.

Once the interval is filled with oil, the light source 26 can be operated to illuminate the borehole wall in the interval. The transport mechanism 30 is operated to position and angle the mirror 28 so as to reflect various parts of the borehole wall in the interval to the lens and computer. By providing, axial movement, rotation and angle adjustment to the mirror, it is possible to provide 360° azimuthal coverage over a large part of the interval without the need to move the camera or lens.

Images of other parts of the borehole can be obtained by releasing the packers 18, 20 and moving the tool body to another part of the borehole where a new isolated interval is established and imaged in the same manner.

Various changes can be made while staying within the scope of the invention. For example, in an alternative embodiment, the a coiled tubing can be used to provide the clear oil for filling the interval instead of a reservoir. Also, while the embodiment above is described in relation to imaging an uncased borehole, the apparatus can also be used inside casing or tubing to examine the interior conditions.

The invention claimed is:

1. Apparatus for obtaining images of the wall of a borehole, comprising:

a tool body;

a light source mounted on the tool body and arranged to illuminate the borehole wall;

a camera mounted in the tool body; and a mirror moveably mounted on the tool body and spaced axially from the camera and arranged to reflect an image of the borehole wall at the camera, wherein movement of the mirror allows images of different parts of the borehole wall to be reflected at the camera, and wherein the mirror is mounted for axial movement along the tool body.

2. Apparatus as claimed in claim 1, wherein the mirror is rotatable around the tool axis.

3. Apparatus as claimed in claim 1, wherein the angle of the mirror to the tool axis is adjustable.

4. Apparatus as claimed in claim 1, wherein the mirror and light source are mounted in a transparent sleeve.

5. Apparatus as claimed in claim 1, wherein means are provided for isolating an interval of the borehole in which images are to be obtained from the remainder of the borehole.

6. Apparatus as claimed in claim 5, wherein the means comprise a pair of packers spaced apart on the tool body.

7. Apparatus as claimed in claim 5, further comprising means for filling the interval with a clear fluid.

8. Apparatus as claimed in claim 7, wherein the means comprise a pump system arranged to removing fluid from the interval and introduce the clear fluid.

9. Apparatus as claimed in claim 7, further comprising a reservoir of clear fluid in the tool body.

10. Apparatus as claimed in claim 5, wherein the camera is mounted near one end of the interval and the light source is mounted near the other end of the interval.

11. Apparatus as claimed in claim 1, further comprising one or more jets arranged to direct fluid flow at the borehole wall to clean deposits therefrom.

12. A method of obtaining images of a borehole wall, comprising:

positioning an imaging apparatus in the borehole, the imaging apparatus comprising a tool body, a light source, a camera, and a mirror axially moveable along the tool body and spaced from the camera;

illuminating the borehole wall with the light source; and moving the mirror so as to reflect images of different parts of the borehole wall at the camera.

13. A method as claimed in claim 12, comprising moving the mirror so as to change one or more of its axial position on the tool body, rotational position about the tool axis or angle to the tool axis.

14. A method as claimed in claim 12, further comprising isolating an interval of the borehole in which images are to be obtained from the remainder of the borehole.

15. A method as claimed in claim 14, further comprising filling the interval with a clear fluid.

16. A method as claimed in claim 14, comprising removing well fluid from the interval and replacing it with the clear fluid.

17. A method as claimed in claim 12, further comprising directing jets of fluid against the borehole wall to remove deposits therefrom.

* * * * *